J. & J. ARNAO, Jr.
ICE VELOCIPEDE.
No. 182,095. Patented Sept. 12, 1876.
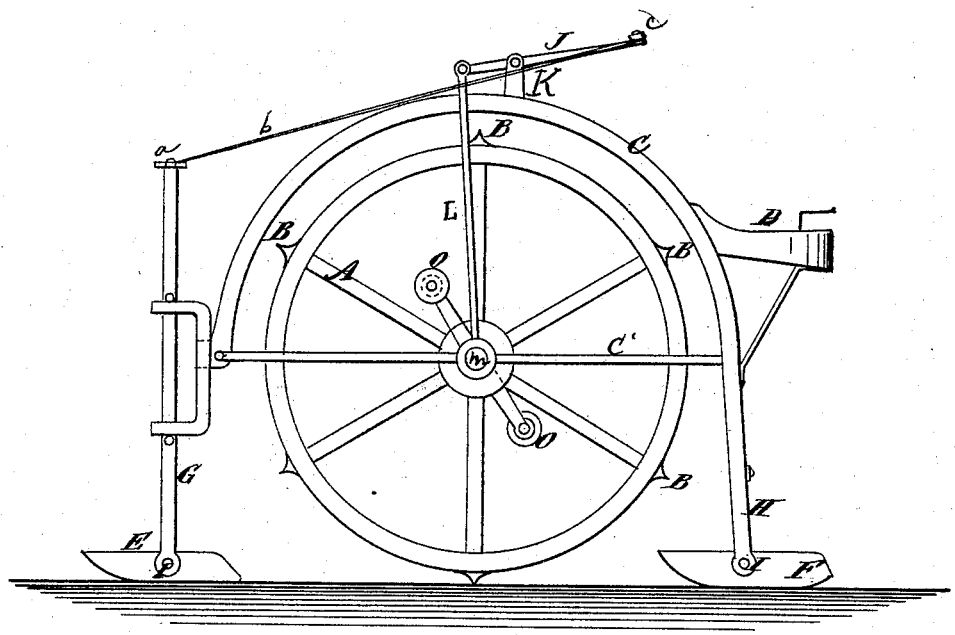

UNITED STATES PATENT OFFICE.

JUAN ARNAO AND JUAN ARNAO, JR., OF BROOKLYN, NEW YORK.

IMPROVEMENT IN ICE-VELOCIPEDES.

Specification forming part of Letters Patent No. 182,095, dated September 12, 1876; application filed June 20, 1876.

*To all whom it may concern:*

Be it known that we, JUAN ARNAO and JUAN ARNAO, Jr., of Brooklyn, in the county of Kings and State of New York, have invented a new and Improved Ice-Velocipede, of which the following is a specification:

Our invention consists of runners attached to uprights, which support the carrying-frame, in which support the runners are pivoted, so that they can oscillate according to the undulations of the surface of the ice, and for passing over small sticks and other objects.

Figure 1 is a side elevation of our improved ice-velocipede, consisting of one wheel and a saddle-carrying frame, the wheel being arranged for operating it by foot-power.

Similar letters of reference indicate corresponding parts.

A represents a drive-wheel, having points B on its periphery, and arranged on a shaft that is journaled in two longitudinal springs, C'. C is the frame, and D a seat located on its rear, so that the rider may conveniently operate the foot-cranks O. H are rear bifurcations of the frame, to whose lower ends are pivoted the runners E E, while G is an independent standard, swiveled in the front of frame, and connected, by cross-pieces *a c* and cords *b b*, with the front end of a lever, J. This enables the rider to guide his velocipede with great facility. The lever J is pivoted to a stud, K, on top of the frame, so as to bring its power end near the driver, and is connected at the other end, by pivoted rods L, with the drive-shaft *m*. By this arrangement the driver can readily lift the wheel from the ground at any time.

What I claim is—

An ice-velocipede having its drive-shaft journaled in the spring-bars C', and connected, by pivoted rods L, with a hand-lever, J, as and for the purpose specified.

JUAN ARNAO.
JUAN ARNAO, JR.

Witnesses:
T. B. MOSHER,
ALEX. F. ROBERTS.